Oct. 23, 1956  C. A. GARVER  2,767,570
COIN-CONTROLLED LOCKER
Filed April 10, 1953  4 Sheets-Sheet 1

*INVENTOR.*
CURTIS A. GARVER
BY Oldham & Oldham
ATTORNEYS

Oct. 23, 1956
C. A. GARVER
2,767,570
COIN-CONTROLLED LOCKER
Filed April 10, 1953
4 Sheets-Sheet 2
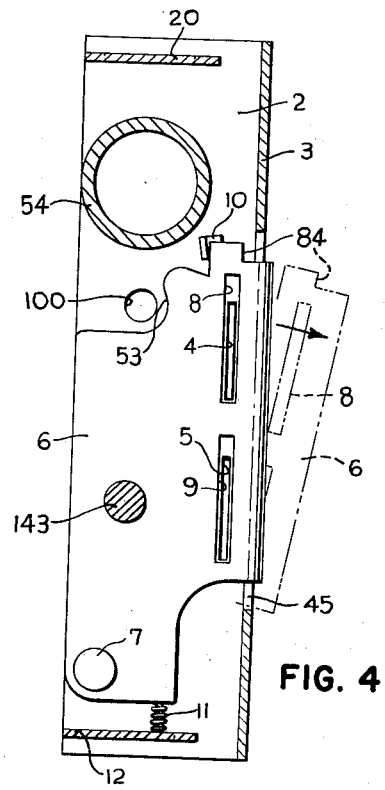
FIG. 4
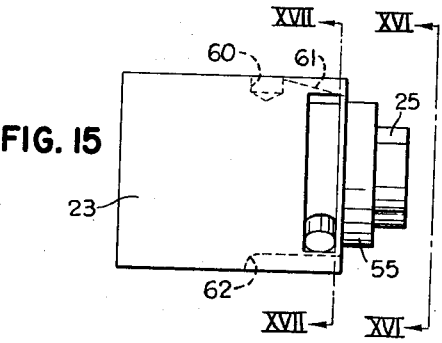
FIG. 15
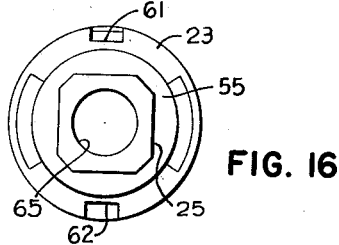
FIG. 16
FIG. 17
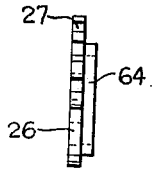
FIG. 20
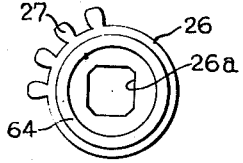
FIG. 19
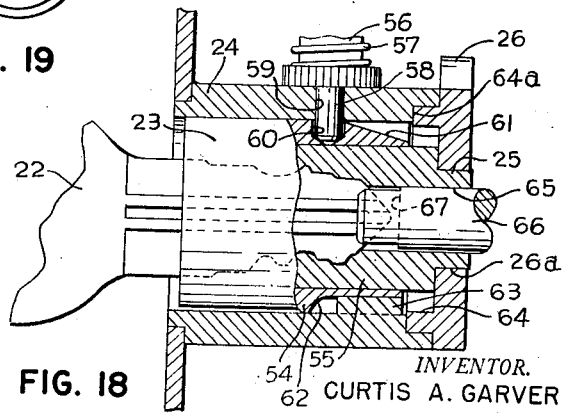
FIG. 18
INVENTOR.
CURTIS A. GARVER
BY Oldham & Oldham
ATTORNEYS Oct. 23, 1956
C. A. GARVER
2,767,570
COIN-CONTROLLED LOCKER
Filed April 10, 1953
4 Sheets-Sheet 3
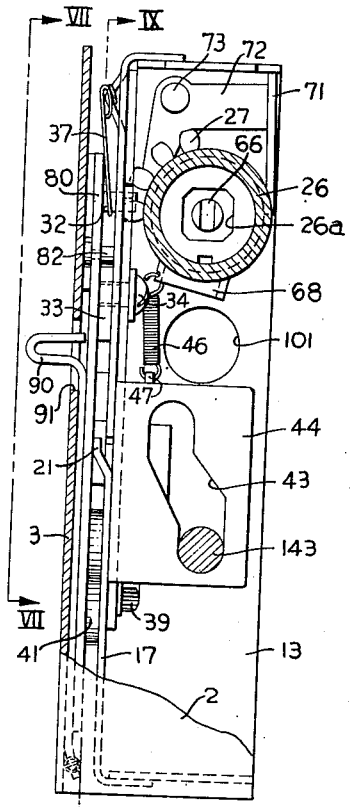
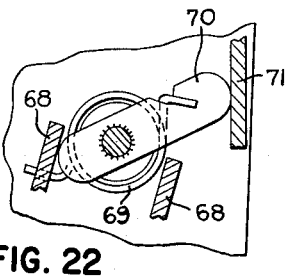
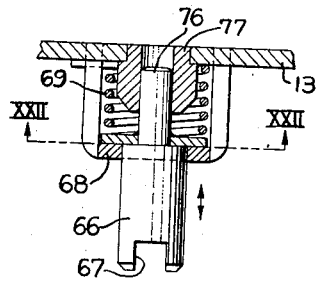
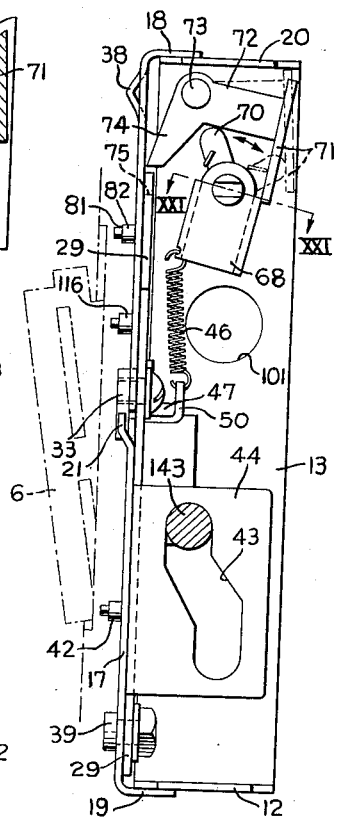
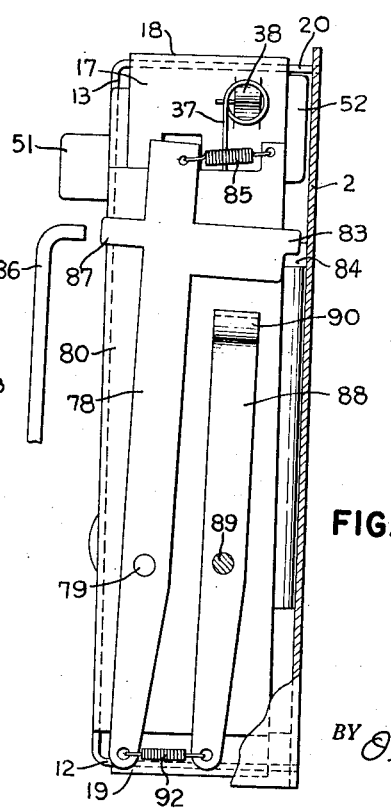
INVENTOR.
CURTIS A. GARVER
BY Oldham &
Oldham
ATTORNEYS Oct. 23, 1956  C. A. GARVER  2,767,570
COIN-CONTROLLED LOCKER
Filed April 10, 1953  4 Sheets-Sheet 4
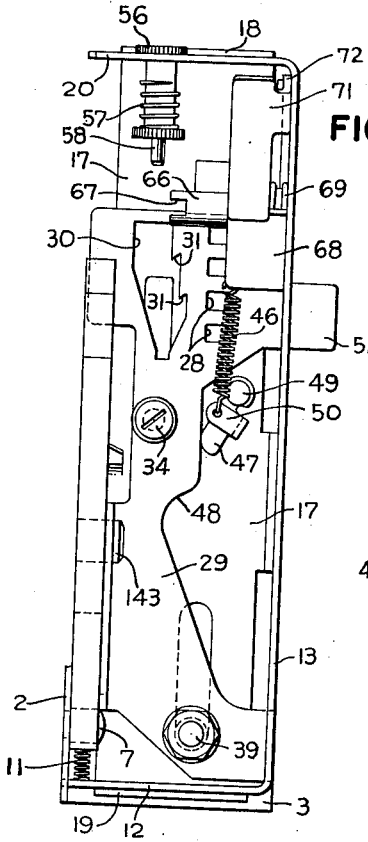
FIG. 11
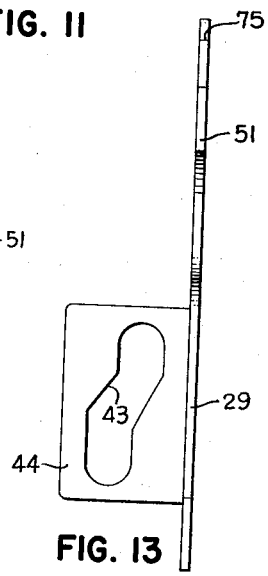
FIG. 13
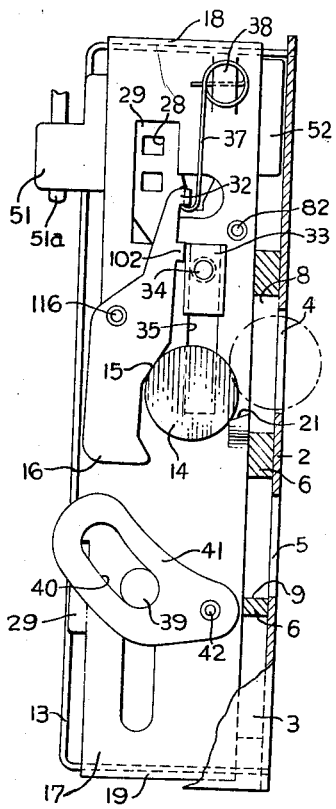
FIG. 9
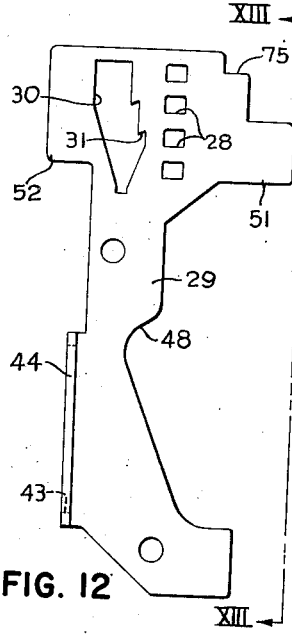
FIG. 12
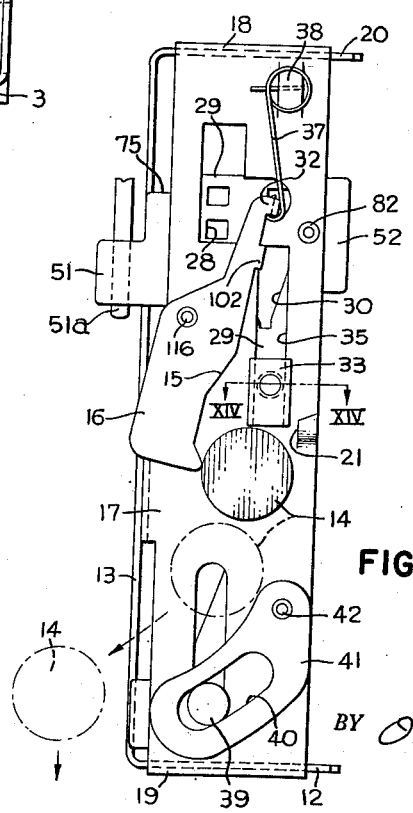
FIG. 10
FIG. 14
INVENTOR.
CURTIS A. GARVER
BY Oldham & Oldham
ATTORNEYS United States Patent Office 2,767,570
Patented Oct. 23, 1956

2,767,570

COIN-CONTROLLED LOCKER

Curtis A. Garver, Millersberg, Ohio, assignor, by mesne assignments, to Guardian Lockers, Inc., Loudonville, Ohio Application April 10, 1953, Serial No. 347,890

11 Claims. (Cl. 70—81)

This invention relates to coin-controlled lockers, and especially to lockers of the type wherein a plurality of lockers or locker boxes are placed in tiered relationship to each other and wherein usually a battery of such lockers are positioned at one place for use.

Heretofore various types of locker constructions of the class referred to have been proposed and some types of lockers have been in wide commercial use. However, such lockers have been relatively costly to produce, and some of such lockers have not had completely satisfactory properties.

The general object of the present invention is to provide a new type of a coin-controlled locker of the class referred to, and to provide a locker characterized by the relatively uncomplicated but sturdy and positive acting construction of the locker control mechanism, and by the improved operational characteristics of such locker.

Yet another object of the invention is to provide a coin-controlled locker operated by a key and wherein the key must be taken from the lock after the lock has been locked before the mechanism can be unlocked.

Another object of the invention is to provide a locker mechanism using a lock cylinder therein wherein the lock cylinder can be easily removed from the remainder of the mechanism and with such lock cylinder being positively and accurately positioned when in engagement with the remainder of the mechanism.

A further object of the invention is to provide a locker control wherein the movable parts of the mechanism have a snap return action at the termination of the unlocking movement to facilitate placing the parts in proper unlocked positions.

Still another object of the invention is to provide a locker which must have the door of the locker closed before the lock mechanism can be operated to be moved to locked position.

Yet another object of the invention is to provide a locker apparatus wherein a coin cannot be inserted into the control means for the locker when it is in locked condition, and with the locker apparatus of the invention being retained inoperative until a load has been placed in the locker.

Another object of this invention is to provide a lock mechanism that with minor changes can be made to operate with different size coins.

Another object of this invention is to provide means to return any coin or slug of a smaller diameter than the coin for which it is made while coins of larger diameter can not enter the opening provided to receive coins.

The foregoing and other objects and advantages of the invention will be made more apparent as the specification proceeds.

In order to understand the invention more completely, one embodiment of the principles of the invention is shown in the accompanying drawings, wherein:

Fig. 4 is a vertical section of the lock taken on line IV—IV of Fig. 2;

Fig. 5 is vertical section of the lock of the invention taken on line V—V of Fig. 3 to show certain levers for controlling the release of the lock for locking action;

Fig. 6 is a vertical section taken on line VI—VI of Fig. 2 of the lock when unlocked and with the lock cylinder removed;

Fig. 7 is a fragmentary left side elevation of the lock of the invention taken on line VII—VII of Fig. 6;

Fig. 8 is a vertical section similar to Fig. 6 only with the cover plate and lock positioning barrel removed and with the lock being in locked position, the position of the bolt being indicated by dotted lines;

Fig. 9 is a vertical section, taken on line IX—IX of the lock of Fig. 6 when in unlocked position, with the coin being received initially in the lock;

Fig. 10 is an elevation of the mechanism shown in Fig. 9 with the front cover plate removed and with the coin having progressed farther into the mechanism which has been moved to locked position;

Fig. 11 is a right side elevation of the lock, like Fig. 2 only with the lock being in its locked position and with the front cover plate and lock support cylinder being removed;

Fig. 12 is an elevation of the slidably positioned keeper plate of the invention as positioned in Fig. 11;

Fig. 13 is a side elevation of the keeper plate of Fig. 12 taken on line XIII—XIII;

Fig. 14 is a fragmentary horizontal section taken on line XIV—XIV of Fig. 10;

Fig. 15 is a side elevation of the lock cylinder of the invention;

Fig. 16 is an end elevation of the lock cylinder taken n line XVI—XVI of Fig. 15;

Fig. 17 is a vertical section of the lock cylinder taken on line XVII—XVII of Fig. 15;

Fig. 18 is a fragmentary vertical section of the lock cylinder and the associated positioning means therefor;

Fig. 19 is an elevation of the gear wheel associated with and controlled by the lock cylinder;

Fig. 20 is a side elevation of the gear wheel of Fig. 19;

Fig. 21 is a fragmentary section taken on line XXI—XXI of Fig. 8 and

Fig. 22 is a fragmentary vertical section taken on line XXII—XXII of Fig. 21 of the key-controlled lock means of the invention.

In order to simplify comparison between the accompanying drawings and the specification, corresponding numerals are used to refer to corresponding parts in the drawings and specifications.

This invention relates in general to coin-controlled lockers, and such lockers normally include a frame, means forming a coin-receiving slot in the locker means, and means including a pivotal coin release lock lever for engaging a coin inserted into the coin-receiving slot. A control lock is provided in the apparatus and has a little free arcuate movement without receipt of a coin in the locker slot, a keeper plate is provided in the mechanism and is controlled by the control lock but usually has its movement iniitally limited by the coin-release lock lever, and means are operatively connected to the keeper plate to contact the coin in the coin-receiving slot and force the coin release lock lever to inoperative position on initial movement of the control lock with a coin in the coin-receiving slot. A lock bolt is present in the mechanism, and means connect the keeper plate to the lock bolt to move the lock bolt to operative lock position on continued movement of the keeper plate after forcing release of the coin release lock lever.

Usually the lock of the invention is vertically positioned and the relationship and operation of the parts will be described as if the lock were so positioned in the accompanying specification.

Figure 1:
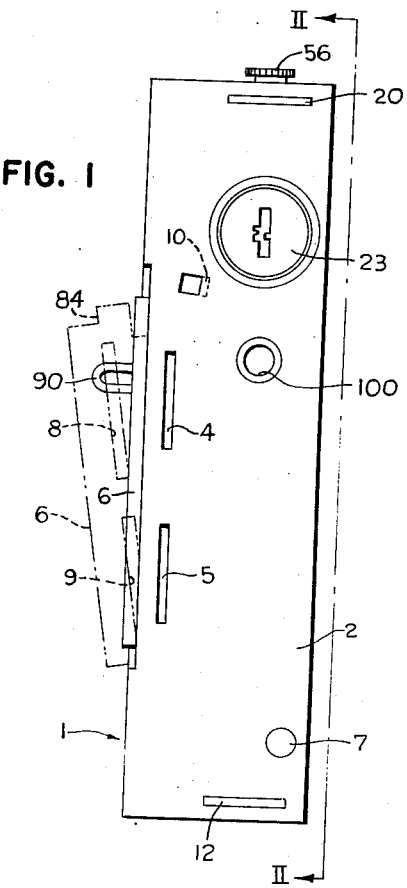
Fig. 1 is a front elevation of a lock mechanism of the invention with the locked position of the bolt being indicated in the drawing.
Figure 2:
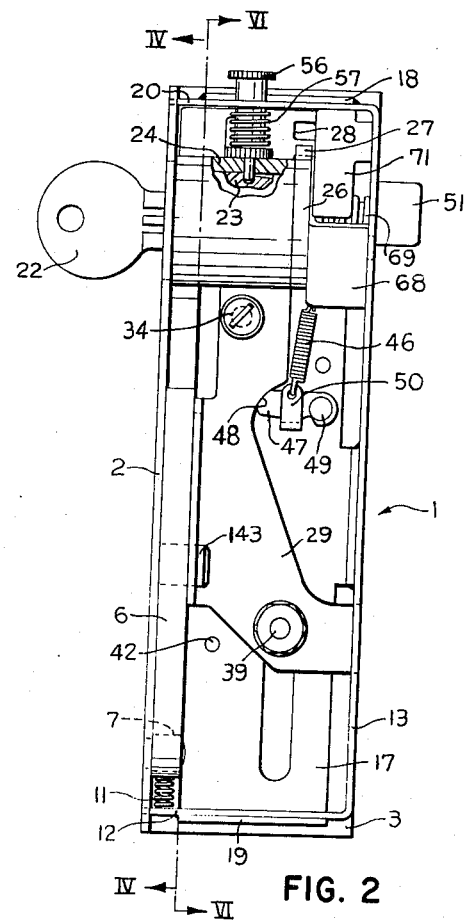
Fig. 2 is a right side elevation of the lock mechanism of Fig. 1 taken on line II—II of Fig. 1.
Figure 3:
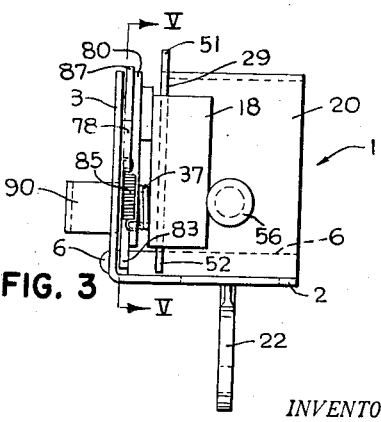
Fig. 3 is a plan view of the lock mechanism of Fig. 1.

The lock of the invention is referred to generally by the numeral 1 and it includes a front cover plate 2 which usually is formed integrally with a left side cover plate 3. A coin receiving slot 4 is formed in a side portion of the front cover plate 2 while a coin return slot 5 is formed in such cover plate positioned vertically below but spaced from the coin entry slot for coin return in case a slug, or a coin smaller than required for operating the lock 1 is deposited in the slot 4. A lock bolt 6 is pivotally positioned on a lower portion of the inner face of the front cover plate 2 by a suitable pin 7 as indicated in Fig. 2. A coin receiving slot 8 is provided in the lock bolt 6 and likewise a coin return slot 9 is provided in such lock bolt and these slots 8 and 9 line up with the slots 4 and 5 in the front cover plate 2, respectively, when the lock bolt is positioned in its unlocked or released position. However, when the lock bolt is operatively positioned, as indicated in Fig. 1 in dotted lines, these coin slots are out of alignment and hence entry of a coin into the mechanism is prevented, so that any accidental insertion of a coin into the apparatus is thus avoided. Fig. 4 shows that the lock bolt 6 is of sufficient depth as to cover the slots 4 and 5 when the lock bolt is in its extended or locked position. Movement of the lock bolt 6 arcuately inwardly of the lock to its unlocked position is limited usually by means of an integral inwardly extending lug 10 struck from the front cover plate 2, as indicated in Fig. 4. Such return movement of the lock bolt 6 may be aided by means of a return spring 11 suitably engaged with the lock bolt 6 at a lower corner portion thereof and compressed against lower cover plate 12 on a rear cover plate 13 of the lock.

Coin receiving means

A coin 14, Fig. 9, is inserted through the coin entry slots 4 and 8 and contacts a recess 15 in a side edge of a coin release lock lever 16 which is pivotally secured to an inner side plate 17 of the lock by a pin 116. The inner side plate 17 has top and bottom end flanges 18 and 19, respectively. The rear cover plate 13 usually has a top cover plate 20 formed integrally therewith and the top and bottom end flanges 18 and 19 are suitably engaged, as by welding to such top cover plates 20 and 12, respectively. The inner side plate 17 has an outwardly extending coin engaging lug 21 provided thereon as indicated in Figs. 9 and 10, and the coin 14 is initially received and wedged between the coin-release lock lever 16 and the lug 21.

Key-controlled parts and lock action

A key 22 is provided for controlling a lock, or lock cylinder 23 which is positioned in a lock sleeve 24 suitably secured to the inner face of the front cover plate 2 for positioning the lock cylinder 23 in the apparatus. The inner end of the barrel in the lock cylinder 23 usually is of non-circular shape and is indicated at 25, Fig. 16, as of substantially square shape. The inner end 25 of the lock cylinder 23 carries a gear disc 26, Figs. 6 and 19, thereon, which gear disc has a gear segment 27 extending therefrom over a relatively short circumferential arc thereof. The gear disc 26 is shown in Figs. 2 and 6, and the gear segment 27 is adapted to engage with a rack 28 usually formed in a slidably positioned keeper plate 29, Figs. 11 and 12 in the lock. The keeper plate 29 is of irregular shape and is clearly shown in Figs. 12 and 13 of the drawings. The rack 28 is shown as a series of holes in the keeper plate. A control recess or hole 30 is provided in the keeper plate 29 and it has a plurality of ratchet teeth 31 formed in one margin thereof for a purpose to be hereinafter more fully explained.

Figs. 9 and 10 best indicate that a catch or lug 32 extends inwardly of the lock from the upper end of the coin release lock lever 16 and such a catch 32 is engaged with the hole 30 in the keeper plate 29. When the coin release lock lever 16 is positioned as indicated in Fig. 9, the catch 32 will engage the lowermost in Fig. 9, the catch 32 will engage the lowermost ratchet tooth 31 as the keeper plate 29 is moved downwardly by rotation of the lock 23 and gear disc 26 by the key 22. There is no other member preventing rotation of the lock cylinder 23 by the key 22, so that the means in the lock 1 for preventing unauthorized operation thereof, is the functioning of the coin release lock lever 16 and the associated mechanism which effectively prevents operation of the lock until a proper size coin 14 is inserted into the lock. In order to move and release the coin release lock lever 16, a coin pusher plate 33, Fig. 9, is secured to the plate 29 by a screw 34 which extends through a vertically extending slot 35 in the inner side plate 17. Fig. 14 thus shows that the coin pusher plate 33 has a guide 36 provided thereon, which snugly engages the slot 35. The screw 34 and associated means also aid in slidably positioning the keeper plate 29 for vertical movement on the inner side plate 17. A spring 37 normally engages the catch 32 on the coin release lock lever 16 for urging the lever into such a position that the catch will engage one of the ratchet teeth 31 upon unauthorized movement of the keeper plate 29. Such spring 37 usually is positioned upon a lug 38 formed on, or struck from the inner side plate 17 at an upper portion thereof, as shown in Fig. 9.

As the plate 29 is moved down initially by turning the key 22, the coin pusher plate 33 is adapted to engage the coin 14 and force it downwardly of the lock, so that the coin release lock lever 16 is pivoted in the lock as shown in Fig. 10, and the catch 32 thereon will be moved out of the path of movement of the ratchet teeth 31 in the hole 30 in the keeper plate 29. Such catch 32 then will not limit operative locking movement of the keeper plate 29 downwardly of the lock. The keeper plate 29 also carries a suitable pin or roller 39 on a lower portion thereof, as shown in Fig. 9. The pin 39 engages an arcuate slot 40 provided in a coin directional arm 41 which is pivotally secured to the inner face plate 17 by a pin 42, as indicated in Figs. 9 and 10. In the unlocked position of the lock, as shown in Fig. 9, the coin directional arm 41 is positioned to throw any slug or small coin in the lock 1 and immediately passing therethrough out through the coin return slots 5 and 9 provided in the front cover plate and bolt of the lock. However, as the keeper plate 29 is moved down into its locked position, the arm 41 is swung down to a position directing any falling coins striking it inwardly of the apparatus and the coins so directed may be collected in any suitable receptacle means (not shown).

The lock bolt 6 is moved into a protruding or locking position by an angularly directed slot 43 provided in a flange plate 44, Figs. 6 and 13, usually formed integrally with the keeper plate 29, and extending normally therefrom. The slot 43 receives a pin, or roller 143 which is secured to and carried by the lock bolt 6 on an inner surface thereof. The lock bolt 6 extends through a longitudinally extending slot 45 formed in the front edge of the side cover plate, as best shown in Fig. 7.

The return movement of the keeper plate 29 to unlocked position is controlled by the key 22 and associated means and the movement is facilitated by use of a return spring 46 which engages or pulls a return arm 47 to its uppermost position (Figs. 2 and 11). The free end of the arm 47 is rounded or of cam shape and it engages a corresponding cam shoulder 48 formed on an edge of the keeper plate 29 for engagement with such shoulder to urge the keeper plate 29 to its uppermost position, as indicated in Fig. 2, whereas the lower position of this plate is shown in Fig. 11. The arm 47 is pivotally positioned by a pin 49 or similar member carried by the inner side plate 17. Usually an offset flange 50 is provided on the arm 47 to engage the spring 46 and retain the spring spaced from the plane of the keeper plate 29 so that such spring will not interfere with the movement of the plate.

As another function of the keeper plate 29, an actuating flange or lug 51 (Fig. 2) is formed integrally therewith and extends beyond the rear or back cover plate 13 intermediate it and the inner side plate 17 for recording the number of times that the lock 1 has been operated. The lug 51 engages with suitable means, such as a link 51a, connected to conventional recording mechanism. A keeper flange or lug 52 is also formed integrally with the side of the keeper plate 29 and protrudes forwardly in the lock. This keeper flange 52 is adapted to be positioned behind and engage a rearwardly extending shoulder 53, Fig. 4, in the top of the lock bolt 6 to retain such lock bolt operatively positioned until the lock has been moved through the proper operative cycle and the keeper plate 29 is again moved upwardly in the lock.

Lock cylinder positioning means

Fig. 18 shows a longitudinal cross-section through the lock cylinder 23 and its positioning means so that this lock cylinder can be readily removed from lock 1 and be changed, should it be necessary to vary the lock and control key used in the lock 1. The lock cylinder 23 is shown as including an outer sleeve 54, in which the actual lock barrel 55 is rotatably positioned. A lock control or positioning member 56 is carried by the top plate 20, as indicated in Fig. 11, and a spring 57 urges such control member 56 downwardly of the lock from the top plate 20. A positioning pin 58 extends downwardly from the control member 56 through a suitable aperture 59 provided in the lock sleeve 24 and extends into a recess or hole 60 extending into the lock barrel 55 on the upper surface thereof. An incline or ramp 61, that extends axially of the lock barrel 55, extends from the inner end of the lock barrel up to the recess 60 and terminates thereat so that the positioning pin 58 can ride up the ramp 61 and seat in the recess 60 when the entire lock cylinder 23 would be inserted into the lock sleeve 24, and likewise the lock cylinder 23 could be removed from engagement with the lock sleeve when the positioning pin 58 is raised by a suitable tool or other means engaged therewith, when the lock mechanism is assembled. The outer sleeve 54 of the lock mechanism also has a longitudinally directed slot 62 formed therein at the bottom thereof which slot received a key or rib 63 provided on the inner surface of the lock sleeve 24 at the axially inner end thereof. This positions the lock cylinder 23 in a non-rotatable manner within the lock sleeve 24. The gear disc 26 is shown as having a boss or annular flange 64 provided thereon, which snugly and slidably engages a shoulder 64a formed on the axially inner end of the lock sleeve 24, so that such gear disc 26 is firmly positioned for arcuate movement in the lock assembly, as the end 25 of the lock barrel engages a square bore 26a of the gear disc 26.

Key removal requirement mechanism

The lock barrel 55 is provided with a bore 65 therein, and, as indicated in Fig. 18, the key 22 does not extend the entire length of such bore 65 when operatively engaged with the lock, so that this open rear portion of the lock mechanism is used to ensure that the key 22 is removed from the lock cylinder 23, before the apparatus of the invention is moved to unlocked from a locked position. A stub shaft 66, which has a slotted inner end 67, is shown journaled in a bracket or frame 68 secured to the rear cover plate 13, as indicated in Figs. 8 and 21 of the drawings. The frame 68 is substantially U-shaped in section, and the stub shaft 66 is urged inwardly of the lock mechanism by a spring 69 positioned in compressed relation between the rear cover plate 13 and a control arm 70 secured to and movable with the stub shaft 66.

Insertion of the key 22 into the bore 65 in the lock barrel engages the key with the slotted end 67 of stub shaft 66 so that arcuate motion of the lock to move the mechanism of the invention to locked position likewise moves the control arm 70 from the position indicated in dotted lines in Fig. 8 over to the position shown in solid lines. Such motion of the control arm 70 disengages it from contact with an end plate 71 usually formed integrally with and extending normally from the plane of a bell crank lever 72 pivotally positioned on an upper portion of the rear cover plate 13 by a pin 73. The remaining arm 74 of the bell crank lever 72 is adapted to abut on a shoulder 75 formed on the keeper plate 29 above the counter lug or flange 51 thereon, all as indicated in Figs. 8 and 12. Fig. 8 shows the bell crank lever 72 when positioned to prevent unlocking movement of the keeper plate 29 whereas the released position of the stub shaft 66 and control arm 70 are indicated in dotted lines at which time they return the bell crank lever 72 to inoperative position. The bell crank lever 72 is free for rotation on the pin 73 and gravity positions the arm 74 to engage the keeper plate 29 if no external force is exerted on the bell crank lever.

The return spring 46 may be anchored to the frame 68 if desired, as shown in Fig. 8.

Fig. 21 of the drawings shows that the stub shaft 66 has an extension cylinder 76 thereon which is snugly received in and journaled by a bearing sleeve 77 suitably carried by the rear cover plate 13.

Accidental lock actuation

Fig. 5 best shows certain means associated with the lock 1 for preventing accidental, or inadvertent actuation of the lock means at some undesired time. A lock arm 78 is pivotally positioned by pin 79 on a carrier plate 80 which extends substantially the entire height of the lock 1. The carrier plate 80 normally is positioned on shoulders 81 provided on the pins 116 and 42 secured to the inner side plate and used to position the coin release lock arm 16 and the coin directional or drop arm 41, respectively. A third pin 82 on the inner side plate also is provided to position the carrier plate. The lock arm 78 has a catch 83 provided at a front portion thereof and this catch 83 is adapted to be engaged normally with a laterally directed shoulder 84 provided on the upper side margin of the lock bolt 6. A spring 85 is connected between an upper portion of the lock arm 78 and the carrier plate 80 to urge such lock arm normally into its operative position and prevent pivoted movement of the lock bolt 6. The lock arm 78 operates through a control bar 86 positioned adjacent the upper portion of the lock arm 78 for contacting a lug 87 provided on the lock arm 78 so that such lock arm cannot be moved from its locked, locker in-operative position unless such control bar 86 is moved out of the pivotal path of the lug 87. The control bar 86 connects to a movable floor plate or similar member (not shown) provided in a lower portion of a locker with which the lock is associated so that a load must be placed on such pivotal floor in order to depress the control bar 86 before the lock means of the invention can be actuated.

Yet a further control is provided in the lock 1 to prevent accidental operation thereof when the door is open, and these means are shown as including a door contact arm 88. The door contact arm 88 is positioned by a pin 89 carried on the inner surface of the side cover plate 3, as shown in Fig. 7, and the door contact arm has a contact extension 90 formed integrally therewith and extending therefrom substantially normally to the remainder of the arm. Such contact extension 90 extends through an arcuate slot 91 formed in the side cover plate and will engage a door (not shown) when the door of the locker with which the lock 1 is associated is closed. The lower end of the door contact arm 88 is connected to the lower end of the lock arm 78 by a spring 92 so that arcuate movement of such door contact arm, when actually engaging a door in a locker assembly, will cause the lock arm 78 to move to its released position if the control bar 86 has previously been moved with relation to the lock arm 78 by a load placed in the locker on the floor thereof. Should the control bar 86 still be operatively positioned with relation to the lug 87 on the lock arm 78, then the spring 92 will merely absorb the relative movement occurring between the still locked lock arm 78 and the movable door contact arm 88 moved by contact of a door therewith.

It should be noted that the coin 14 is received within a coin receiving space or slot formed between the inner side plate 17 and the carrier plate 89 of the lock 1.

As the space between the coin release lock lever 16 and the associated lug 21 can be accurately determined and constructed, it is possible to adapt the lock 1 to permit small slugs or coins of improper size to immediately pass through the lock and be returned to the person placing them in the lock.

The lock 1 is secured to suitable means such as a support post (not shown) of a locker by a bolt of similar member that extends through and engages a hole 100 in the front cover plate 2 and passes through a hole 101 in the rear cover plate 13.

If it is desired to change the lock of the invention to be operated by a different size coin, all that is required to be done is to remove the bolt securing the lock in position, substitute a new lock bolt 6 with a desired size coin receiving slot therein, and substitute a different size coin release lock lever for the lock lever 16. Usually the front cover plate would have a coin receiving slot 4 of proper size to receive any size operating coin and would not have to be changed. The new coin release lock lever used would be of such size as to wedge the operative coin against the coin engaging lug 21. The revised lock then would be engaged with its support post, and be ready for use.

Fig. 9 best shows that when a coin is inserted into the lock 1, it initially engages an upper portion of the lock lever 16. As the coin pusher plate 33 moves down and forces the coin downwardly, the coin pivots the lock lever 16 to move it to its release position and the coin moves down to pass to the coin receiving means of the apparatus. The lock lever 16 usually has a lug 102 thereon which bears on the coin pusher plate 33 in the unlocked position. The lock lever and plate 33 cooperate to prevent admission of a coin when the lock 1 is in locked position.

It will be understood that at some times the lock may be used without any type of a load control, as shown in Fig. 5. Thus the control bar 86 would be omitted and the lug 87 also could be omitted, if desired.

It is thought that the operation of the locking mechanism of the invention will be apparent by reviewing the drawings and studying the specification. It will be observed that a novel keeper plate has been provided by the invention, which keeper plate is adapted to control, in general, the operations of the lock and which keeper plate will also actuate counter means to record the number of times that the locker mechanism of the invention has been operated.

The lock of the invention is of relatively sturdy but yet uncomplicated construction and it provides a number of desirable safety means therein to prevent unauthorized operation of the locker mechanism, to prevent accidental unlocking of the locker mechanism until the key has been removed and usually the locker has gone through an operative storage cycle, while the locker mechanism also cannot be inadvertently operated through a cycle when no load is placed in the locker so that the user of the locker mechanism is protected against undesired loss of the coin required to actuate the lock means of the invention. Accordingly, it is submitted that the objects of the invention have been achieved.

While a complete embodiment of the invention has been disclosed herein, it will be appreciated that modification of this particular embodiment of the invention may be resorted to without departing from the scope of the invention as defined in the appended claims.

What is claimed is:

1. In a coin-controlled locker assembly, a frame, a lock barrel having an axially directed key hole extending therethrough exposed at one end through said frame, a stub shaft journalled on said frame in alignment with and adjacent the inner end of said lock barrel, spring means urging an end of said stub shaft into the inner end of said keyhole, said end of said stub shaft being slotted for engaging a key and turning therewith, a pivotally positioned lock bolt, a slidably positioned keeper plate for retaining said lock bolt in operative position, a bell crank for being positioned by gravity to engage said keeper plate to prevent release movement thereof when said lock bolt is operatively positioned, a control arm secured to said stub shaft for normally engaging said bell crank to move it to inoperative position, and spring means for urging said control arm into engagement with said bell crank but being overcome by turning action of a key in said lock barrel.

2. In a coin-controlled locker assembly, a frame, a lock barrel having an axially directed key hole extending therethrough exposed at one end through said frame, a stub shaft journalled in alignment with and adjacent the inner end of said lock barrel for engaging a key in said lock barrel, a pivotally positioned lock bolt, a slidably positioned keeper plate for retaining said lock bolt in operative position, a bell crank for being positioned to engage said keeper plate to prevent release movement thereof when said lock bolt is operatively positioned, means secured to said stub shaft for normally engaging said bell crank to move it to inoperative position, and means for urging said last-named means into engagement with said bell crank but being overcome by turning action of a key in said lock barrel.

3. In a coin-controlled locker assembly, a lock having an axially directed key hole extending therethrough, a stub shaft separate from but journalled in alignment with and adjacent the inner end of said lock, said stub shaft being movable axially of said lock and being adapted to engage a key in said lock and turn therewith, a movably positioned keeper plate for retaining a lock bolt in operative position, a member normally positioned by gravity for engaging said keeper plate to prevent movement thereof to release a lock bolt when the lock bolt is operatively positioned, and arm means secured to said stub shaft for engaging said member to move it to inoperative position, the action of said arm means being overcome by the turning action of a key in said lock turning it to locked position to permit said member to engage said keeper plate, said arm means being released by withdrawal of a key from said lock so that said arm means can position said member inoperatively.

4. In a lock mechanism, latch means, keeper means for retaining said latch means in operative position, other means positioned automatically for engaging said keeper means to prevent unlocking movement thereof, a lock cylinder, key controlled means separate from and movable independently of said lock cylinder for moving said other means out of locking relation to said keeper means, and spring means for urging said key controlled means into engagement with said other means to position said other means in non-operative relation to said keeper means.

5. In a coin controlled locker assembly, a pivotally positioned lock arm, a pivotally positioned lock bolt with a shoulder thereon, said lock arm having a catch thereon for engaging said lock bolt shoulder to prevent movement of said lock bolt, spring means urging said lock arm to engage said catch with said lock bolt, a door contact arm pivotally positioned in the assembly for movement by a door moved to closed position, spring means coupling said door contact arm to said lock arm for moving said lock arm against the action of said first named spring means to inoperative position if no other force restrains such movement when said door contact arm is moved by closing a locker door, and means controlled by load in the locker for preventing movement of said lock arm when the locker is not loaded.

6. In a coin controlled locker assembly, a pivotally positioned lock arm, a pivotally positioned lock bolt with a shoulder thereon, said lock arm having a catch thereon for engaging said lock bolt shoulder to prevent movement of said lock bolt, means urging said lock arm to engage said catch with said lock bolt, means for moving said lock arm to released position when a locker door associated therewith is closed, said lock arm moving means being spring coupled to said lock arm, and means controlled by load in the locker for preventing release movement of said lock arm when the locker is not loaded.

7. In a coin controlled locker, pivotally positioned lock arm, a lock bolt, said lock arm having a catch thereon for engaging said lock bolt to prevent movement of said lock bolt, means urging said lock arm to engage said catch with said lock bolt, means for moving said lock arm to inoperative position when a locker door for the locker is closed, and means controlled by load in the locker for preventing movement of said lock arm when the locker is not loaded.

8. In a coin controlled locker assembly, a slidably positioned keeper plate including a rack gear, ratchet teeth, a hole with said ratchet teeth defining a portion of the hole, and a slotted flange bracket; lock means including a gear for engaging said rack gear to move said keeper plate; means for engaging said ratchet teeth to prevent unauthorized movement of said keeper plate; a lock bolt; and pin means connecting said lock bolt to said slot in said keeper plate for movement when said keeper plate is moved.

9. In a coin-controlled lock, a lock bolt, a slidably positioned keeper plate directly engaging and controlling said lock bolt, lock means for moving said keeper plate, a return arm continually contacting said keeper plate for only engaging said keeper plate as it is moved to approach an unlocked position, and spring means engaging said return arm to aid in snapping said keeper plate to unlocked position.

10. In a coin-controlled locker assembly, a frame, a lock barrel having an axially directed key hole extending therethrough exposed at one end through said frame, a stub shaft separate from but journalled in alignment with and adjacent the inner end of said lock barrel for engaging a key in said lock barrel, a pivotally positioned lock bolt, a slidably positioned keeper plate for retaining said lock bolt in operative position, a bell crank for being positioned normally by gravity to engage said keeper plate to prevent release movement thereof when said lock bolt is operatively positioned, means secured to said stub shaft for engaging said bell crank to move it to inoperative position, and spring means for urging said last-named means into engagement with said bell crank to position it away from its keeper plate engaging position but being overcome by turning action of a key in said lock barrel.

11. In a coin-controlled locker assembly, a slidably positioned keeper plate including a rack gear and a slotted flange bracket; gear means for engaging said rack gear to move said keeper plate; a lock bolt; and pin means connecting said lock bolt to the slot in said slotted flange bracket for movement of said lock bolt when said keeper plate is moved.

References Cited in the file of this patent

UNITED STATES PATENTS

| | | |
|---|---|---|
| 888,828 | Lippert | May 26, 1908 |
| 1,260,763 | Frix | Mar. 26, 1918 |
| 1,283,802 | King | Nov. 5, 1918 |
| 1,422,691 | Gape | July 11, 1922 |
| 1,505,361 | McDaniel | Aug. 19, 1924 |
| 1,500,297 | Best | July 8, 1924 |
| 1,531,487 | Lundberg | Mar. 31, 1925 |
| 1,635,714 | Hoffman | July 12, 1927 |
| 1,700,129 | Hausmann | Jan. 29, 1929 |
| 2,148,693 | Hamilton | Feb. 28, 1939 |
| 2,181,289 | Wells | Nov. 28, 1939 |
| 2,234,810 | Simpson | Mar. 11, 1941 |
| 2,437,742 | Hofmann | Mar. 16, 1948 |
| 2,573,679 | Allen | Nov. 6, 1951 |
| 2,658,783 | Allen | Nov. 10, 1953 |
| 2,684,144 | Beimel | July 20, 1954 |